United States Patent

Tatsuta et al.

[11] 4,082,686
[45] Apr. 4, 1978

[54] LIQUID CRYSTAL COMPOSITION

[75] Inventors: Hiroshi Tatsuta, Neyagawa; Masakazu Fukai, Nishinomiya; Hiroaki Takahashi, Nagasaki, all of Japan

[73] Assignee: Matsushita Electric Industrial Co., Ltd., Osaka, Japan

[21] Appl. No.: 601,343

[22] Filed: Aug. 4, 1975

[30] Foreign Application Priority Data

Aug. 6, 1974 Japan .................................. 49-90473
Aug. 6, 1974 Japan .................................. 49-90474
Sep. 2, 1974 Japan .................................. 49-101141
Sep. 11, 1974 Japan .................................. 49-105405
Sep. 11, 1974 Japan .................................. 49-105406
Nov. 19, 1974 Japan .................................. 49-133996

[51] Int. Cl.² ........................... C09K 3/34; G02F 1/13
[52] U.S. Cl. ..................................... 252/299; 252/408; 350/350
[58] Field of Search ................. 252/299, 408 LC; 350/160 LC

[56] References Cited

U.S. PATENT DOCUMENTS

| | | | |
|---|---|---|---|
| 3,655,270 | 4/1972 | Creagh | 252/299 |
| 3,731,986 | 5/1973 | Fergason | 252/299 |
| 3,838,059 | 9/1974 | Wong | 252/299 |
| 3,965,029 | 6/1976 | Arora | 252/299 |
| 3,970,579 | 7/1976 | Taylor | 252/299 |
| 3,997,463 | 12/1976 | Narusawa et al. | 252/299 |

OTHER PUBLICATIONS

Elliott, G., et al., Electronics Letters, vol. 9, No. 17, pp. 399-401 (Aug. 23, 1973).
Arora, S. L. et al., Mol. Cryst. Liq. Cryst., vol. 10, pp. 243-257 (1970).
Kast, Landolt-Bornstein, 6th Ed., Springer-Verlag, Berlin, vol. 2, part 2a, pp. 266-267, 309-310 (1960).
Creagh, L. T., Proc. IEEE, vol. 61, No. 7, pp. 814-822. (Jul. 1973).

*Primary Examiner*—Benjamin R. Padgett
*Assistant Examiner*—T. S. Gron
*Attorney, Agent, or Firm*—Stevens, Davis, Miller & Mosher

[57] ABSTRACT

A nematic liquid crystal composition comprising at least one of the compounds of the formula,

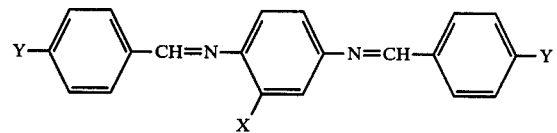

wherein X is methyl or chlorine, Y is a normal-$C_nH_{2n+1}$ group wherein $n$ is an integer of 1 to 8, provided that when X is methyl $n$ is an integer of 2 to 8, and when X is chlorine $n$ is an integer of 1 to 6. The nematic liquid crystal composition is operable over a wide temperature range.

5 Claims, No Drawings

LIQUID CRYSTAL COMPOSITION

This invention relates to a novel nematic composition for use in a liquid crystal display device.

The liquid crystal display device is an electro-optical display device which diffuses or modulates light rays from a light source by utilizing a thin layer of a nematic state composition in which the molecules are arranged in a specific pattern. This device comprises a first light-transmissible substrate material, a first light-transmissible and electrically conductive coating applied on the first substrate material, a second substrate material, and a second light-transmissible and electrically conductive coating applied on the second substrate material. The device, as generally known, is so constructed that when a voltage is applied between said conductive coatings placed facing each other with a gap between them, said gap having been filled with a nematic liquid crystal composition, the latter undergoes a change in its molecular arrangement, resulting in a velocity difference between the ordinary ray and the extraordinary ray of an incident light, a change in the amount of light absorbed, and scattering of light due to the current flowing through said nematic light crystal composition.

An optical display device, among these known examples, has employed a nematic liquid crystal which was developed for use in an electro-optical liquid crystal display device operable at temperatures (about 25° C.) prevailing usually in residential structures.

There has been a strong demand, on the other hand, for a nematic liquid crystal material which may remain in the nematic state in a wider temperature range, because such a material would enlarge the operable temperature range of an optical display device, leading to exploitation of new application fields for the electro-optical light crystal display device.

This invention is based on the finding that a number of specific compounds among bis(4'-n-alkylbenzal)-2-methyl-1,4-phenylenediamines,

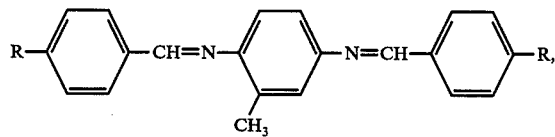

and bis(4'-n-alkylbenzal)-2-chloro-1,4-phenylenediamines,

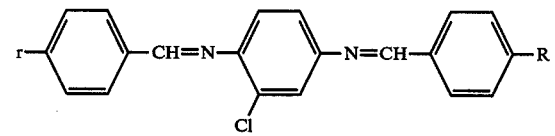

(R represents an alkyl group) remain in the nematic state at temperatures over wide ranges and that a composition containing as one of the components at least one of said specific compounds also remains in the nematic state over a wide temperature range.

Thus, according to the present invention there is provided a nematic liquid crystal composition comprising at least one of the compounds of the formula,

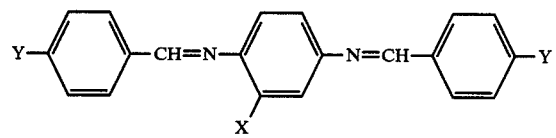

wherein X is methyl or chlorine, Y is a normal $-C_nH_{2n+1}$ group wherein $n$ is an integer of 1 to 8, provided that when X is methyl $n$ is an integer of 2 to 8, and when X is chlorine $n$ is an integer of 1 to 6. Such a nematic liquid crystal composition is very useful for the electro-optical liquid crystal display device.

Before disclosing the invention in further detail, the procedure for synthesizing the present novel compounds is given below.

SYNTHESIS EXAMPLE 1

In 500 ml of benzene, were dissolved 0.2 mole of distilled and dried p-ethylbenzaldehyde,

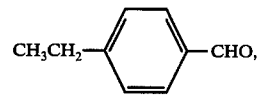

and 0.1 mole of distilled and dried 2,5-diaminotoluene,

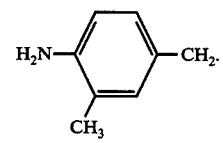

The resulting solution was refluxed for 4 hours, while removing the azeotropically distilled water by means of a Dean-Stark trap. Thereafter, the solvent was removed from the reaction mixture by distillation by use of a rotary evaporator. The distillation residue was collected and purified by repeated recrystallization from ethyl alcohol until a constant melting point was attained to obtain bis(4'-ethylbenzal)-2-methyl-1,4-phenylenediamine,

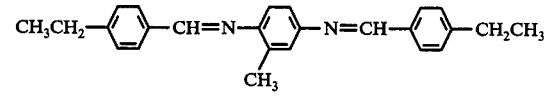

(Compound A), which remained in a nematic state in the temperature range of 93.8° – 182.5° C. (hereinafter said mesomorphic temperature range is referred to as M.R.).

In a manner similar to that mentioned above, the following compounds were prepared.

o Bis-(4'-n-propylbenzal)-2-methyl-1,4-phenylenediamine

-continued

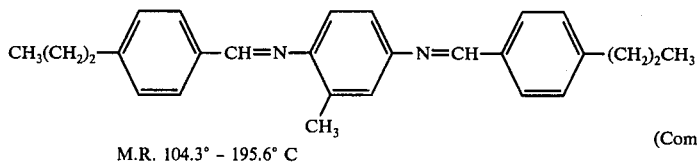

M.R. 104.3° – 195.6° C (Compound B)

o Bis-(4'-n-butylbenzal)-2-methyl-1,4-phenylenediamine

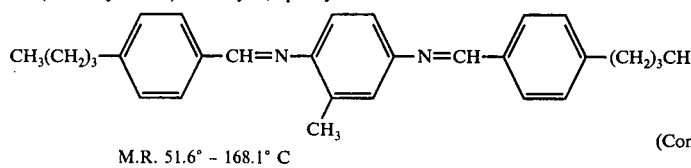

M.R. 51.6° – 168.1° C (Compound C)

o Bis-(4'-n-pentylbenzal)-2-methyl-1,4-phenylenediamine

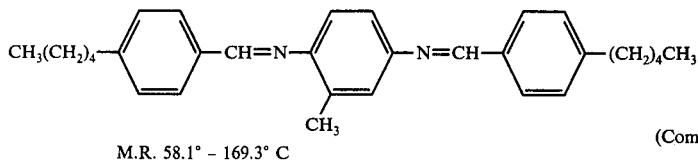

M.R. 58.1° – 169.3° C (Compound D)

o Bis-(4'-n-hexylbenzal)-2-methyl-1,4-phenylenediamine

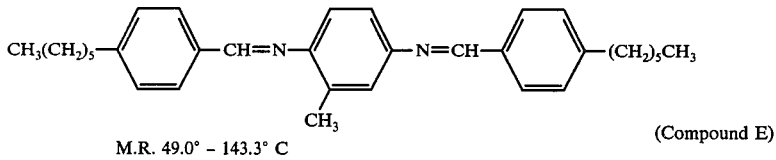

M.R. 49.0° – 143.3° C (Compound E)

o Bis-(4'-n-heptylbenzal)-2-methyl-1,4-phenylenediamine

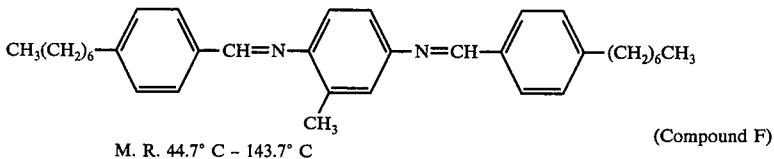

M. R. 44.7° C – 143.7° C (Compound F)

o Bis-(4'-n-octylbenzal)-2-methyl-1,4-phenylenediamine

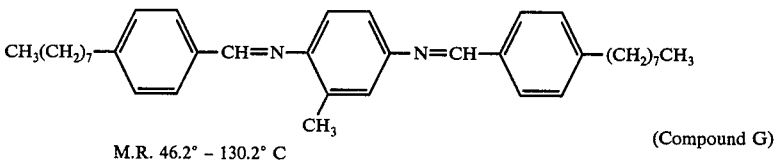

M.R. 46.2° – 130.2° C (Compound G)

SYNTHESIS EXAMPLE 2

2-Chloro-1,4-phenylenediamine sulfate,

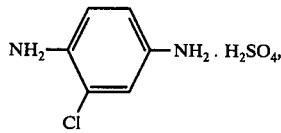

was dissolved in water, neutralized with an aqueous sodium hydroxide solution, and extracted with ethyl ether. The ether extract layer, after removal of the ether, was purified by recrystallization, repeated twice, from chlorobenzene, and dried to obtain 2-chloro-1,4-phenylenediamine,

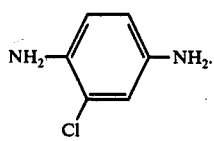

In 500 ml of benzene, were dissolved 0.1 mole of said 2-chloro-1,4-phenylenediamine and 0.2 mole of distilled and dried p-methylbenzaldehyde. The resulting solution was refluxed for about 4 hours, while removing the azeotropically distilled water by means of a Dean-Stark trap. Thereafter, the solvent was removed from the reaction mixture by distillation by use of a rotary evaporator. The distillation residue was collected and purified by repeated recrystallization from isopropyl alcohol until a constant melting point was attained to obtain bis(4'-methylbenzal)-2-chloro-1,4-phenylenediamine,

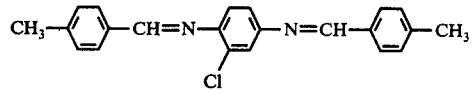

(Compound H), which showed M.R. of 144.4° – 196.6° C.

In a manner similar to that mentioned above, the following compounds were prepared.

o Bis-(4'-ethylbenzal)-2-chloro-1,4-phenylenediamine

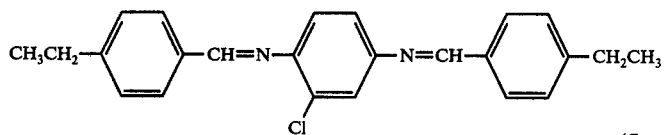

M. R. 110.2° – 164.0° C (Compound I)

o Bis-(4'-n-propylbenzal)-2-chloro-1,4-phenylenediamine

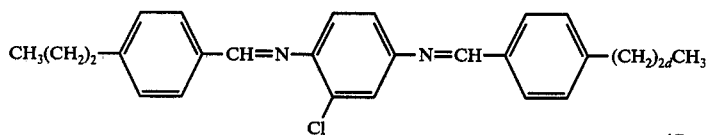

M. R. 84.8° – 186.7° C (Compound J)

o Bis-(4'-n-butylbenzal)-2-chloro-1,4-phenylenediamine

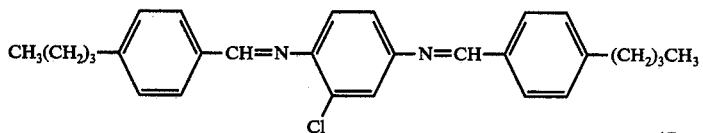

M. R. 49.6° – 155.5° C (Compound K)

o Bis-(4'-n-pentylbenzal)-2-chloro-1,4-phenylenediamine

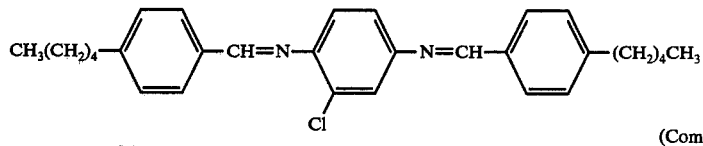

M.R. 41.5° – 157.8° C (Compound L)

o Bis-(4'-n-hexylbenzal)-2-chloro-1,4-phenylenediamine

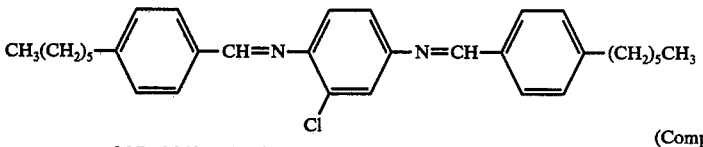

M.R. 36.8° – 134.0° C (Compound M)

There is scarcely any single compound which remains in nematic liquid crystal state at temperatures in a wide range including those in the neighborhood of room temperature. Accordingly, attempts have been made to achieve the object by a mixture of two or more compounds.

According to this invention, there is provided a composition which remains in nematic state at temperatures over a wide range and, in addition, at temperatures in the neighborhood of room temperature, by mixing the present novel nematic liquid crystal compound with other compounds in a suitable proportion. Such a composition is very useful as a liquid crystal material for use in an electro-optical liquid crystal display device.

By way of illustration, but not by way of limitation, Examples of compositions according to this invention are listed below.

| Ex. No. | Nematic liquid crystal composition | Compound (% by weight) | Mesomorphic Range (° C.) |
|---|---|---|---|
| 1 | Compound B $$CH_3(CH_2)_2O-\bigcirc-CH=N-\bigcirc-(CH_2)_4CH_3$$ | 25 75 | 26–96 |
| 2 | Compound B $$CH_3(CH_2)_2O-\bigcirc-CH=N-\bigcirc-(CH_2)_4CH_3$$ | 50 50 | 63.5 |
| 3 | Compound B $$CH_3(CH_2)_3O-\bigcirc-CH=N-\bigcirc-(CH_2)_3CH_3$$ | 25 75 | 30–96.5 |
| 4 | Compound B $$CH_3O-\bigcirc-CH=N-\bigcirc-(CH_2)_2CH_3$$ | 50 50 | 52–129 |
| 5 | Compound C $$CH_3O-\bigcirc-CH=N-\bigcirc-O-\overset{O}{\underset{\parallel}{C}}-(CH_2)_2CH_3$$ | 49.5 50.5 | 18–142.5 |
| 6 | Compound C $$CH_3(CH_2)_3O-\bigcirc-CH=N-\bigcirc-(CH_2)_3CH_3$$ | 50.4 49.6 | −20–113.2 |
| 7 | Compound C $$CH_3(CH_2)_2O-\bigcirc-CH=N-\bigcirc-(CH_2)_4CH_3$$ | 50 50 | 7.5–111.5 |
| 8 | Compound C $$CH_3CH_2O-\bigcirc-CH=N-\bigcirc-(CH_2)_3CH_3$$ | 25.7 74.3 | 16–102.6 |
| 9 | Compound C $$CH_3O-\bigcirc-CH=N-\bigcirc-(CH_2)_6CH_3$$ | 50.2 49.8 | 5–112.2 |
| 10 | Compound C $$CH_3O-\bigcirc-CH=N-\bigcirc-(CH_2)_2CH_3$$ | 50 50 | −20–113.9 |

-continued

| Ex. No. | Nematic liquid crystal composition | Compound (% by weight) | Mesomorphic Range (° C.) |
|---|---|---|---|
| 11 | Compound C $CH_3O-\bigcirc-CH=N-\bigcirc-(CH_2)_3CH_3$ | 49.5 50.5 | −20–102.6 |
| 12 | Compound C $CH_3-\bigcirc-CH=N-\bigcirc-CH_2CH_3$ | 75.5 24.5 | −20–126.5 |
| 13 | Compound C $CH_3(CH_2)_2-\bigcirc-CH=N-\bigcirc-(CH_2)_4CH_3$ | 51.4 48.6 | −20–91.2 |
| 14 | Compound C $CH_3O-\bigcirc-CH=N-\bigcirc-(CH_2)_2CH_3$ | 50.7 49.3 | 22.5–118.8 |
| 15 | Compound D $CH_3-\bigcirc-CH=N-\bigcirc-CH_2CH_3$ | 49.5 50.5 | 0–82.2 |
| 16 | Compound D $CH_3(CH_2)_2O-\bigcirc-CH=N-\bigcirc-(CH_2)_9CH_3$ | 50.1 49.9 | 16–116 |
| 17 | Compound D $CH_3CH_2O-\bigcirc-CH=N-\bigcirc-(CH_2)_3CH_3$ | 48.5 51.5 | 13–121.5 |
| 18 | Compound D $CH_3O-\bigcirc-CH=N-\bigcirc-O-\overset{O}{\underset{\|}{C}}-(CH_2)_2CH_3$ | 55.4 44.6 | 25–142.7 |
| 19 | Compound D $CH_3(CH_2)_3O-\bigcirc-CH=N-\bigcirc-(CH_2)_3CH_3$ | 49.1 50.9 | 7.5–117.5 |
| 20 | Compound D $CH_3(CH_2)_2-\bigcirc-CH=N-\bigcirc-(CH_2)_4CH_3$ | 50.4 49.6 | 16–99.7 |
| 21 | Compound D | 50.2 | 8–114 |

| Ex. No. | Nematic liquid crystal composition | Compound (% by weight) | Mesomorphic Range (° C.) |
|---|---|---|---|
| | 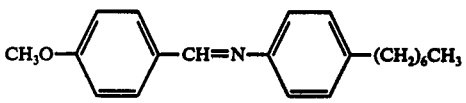 CH₃O—⟨⟩—CH=N—⟨⟩—(CH₂)₆CH₃ | 49.8 | |
| 22 | Compound D 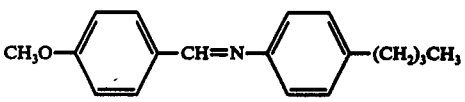 CH₃O—⟨⟩—CH=N—⟨⟩—(CH₂)₃CH₃ | 51.4 48.6 | 0–110.3 |
| 23 | Compound D 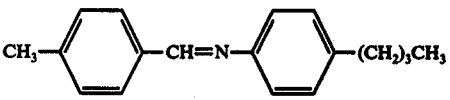 CH₃—⟨⟩—CH=N—⟨⟩—(CH₂)₃CH₃ | 74.2 28.5 | 25–110.6 |
| 24 | Compound E 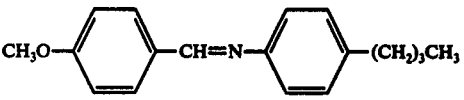 CH₃O—⟨⟩—CH=N—⟨⟩—(CH₂)₃CH₃ | 49.9 50.1 | −20–94 |
| 25 | Compound E 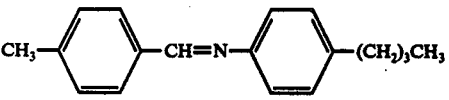 CH₃—⟨⟩—CH=N—⟨⟩—(CH₂)₃CH₃ | 75.3 24.7 | 11–92.4 |
| 26 | Compound E 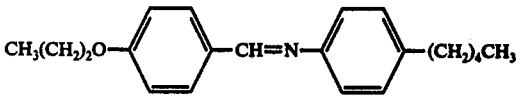 CH₃(CH₂)₂O—⟨⟩—CH=N—⟨⟩—(CH₂)₄CH₃ | 50.5 49.5 | 2–100.2 |
| 27 | Compound E 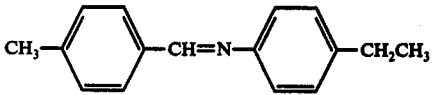 CH₃—⟨⟩—CH=N—⟨⟩—CH₂CH₃ | 50.4 49.6 | 16–81.5 |
| 28 | Compound E 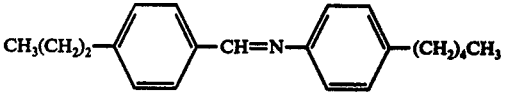 CH₃(CH₂)₂—⟨⟩—CH=N—⟨⟩—(CH₂)₄CH₃ | 50 50 | −1–87.2 |
| 29 | Compound E 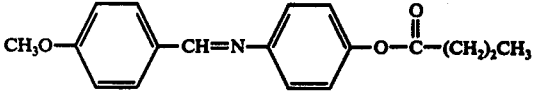 CH₃O—⟨⟩—CH=N—⟨⟩—O—C(=O)—(CH₂)₂CH₃ | 50.4 49.6 | 20–133.3 |
| 30 | Compound E 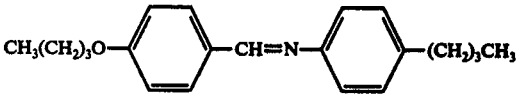 CH₃(CH₂)₃O—⟨⟩—CH=N—⟨⟩—(CH₂)₃CH₃ | 52.7 47.3 | 0–104.4 |
| 31 | Compound E 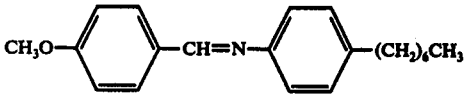 CH₃O—⟨⟩—CH=N—⟨⟩—(CH₂)₆CH₃ | 50.2 49.8 | 35–102.8 |

| Ex. No. | Nematic liquid crystal composition | Compound (% by weight) | Mesomorphic Range (° C.) |
|---|---|---|---|
| 32 | Compound E <br> 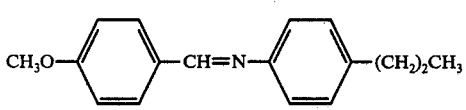 CH$_3$O—⟨⟩—CH=N—⟨⟩—(CH$_2$)$_2$CH$_3$ | 50.2 <br> 49.8 | 13.5–103.7 |
| 33 | Compound E <br> 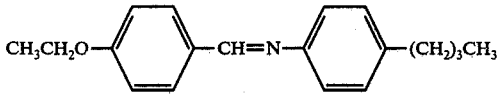 CH$_3$CH$_2$O—⟨⟩—CH=N—⟨⟩—(CH$_2$)$_3$CH$_3$ | 53.3 <br> 46.7 | 7–107.2 |
| 34 | Compound F <br> 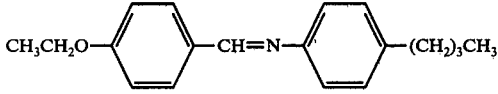 CH$_3$CH$_2$O—⟨⟩—CH=N—⟨⟩—(CH$_2$)$_3$CH$_3$ | 50.1 <br> 49.9 | 16–112.3 |
| 35 | Compound F <br> 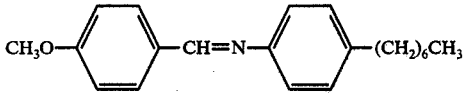 CH$_3$O—⟨⟩—CH=N—⟨⟩—(CH$_2$)$_6$CH$_3$ | 50 <br> 50 | 6–114.7 |
| 36 | Compound F <br> 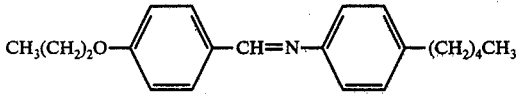 CH$_3$(CH$_2$)$_2$O—⟨⟩—CH=N—⟨⟩—(CH$_2$)$_4$CH$_3$ | 50.2 <br> 49.8 | −5–109.2 |
| 37 | Compound F <br> 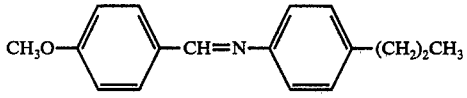 CH$_3$O—⟨⟩—CH=N—⟨⟩—(CH$_2$)$_2$CH$_3$ | 75.4 <br> 24.6 | 14–128.6 |
| 38 | Compound F <br> 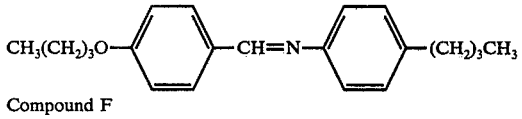 CH$_3$(CH$_2$)$_3$O—⟨⟩—CH=N—⟨⟩—(CH$_2$)$_3$CH$_3$ | 49.8 <br> 50.2 | 1–106.1 |
| 39 | Compound F <br> 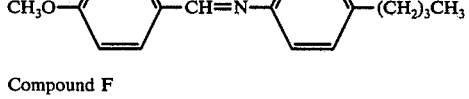 CH$_3$O—⟨⟩—CH=N—⟨⟩—(CH$_2$)$_3$CH$_3$ | 50 <br> 50 | −20–97.5 |
| 40 | Compound F <br> 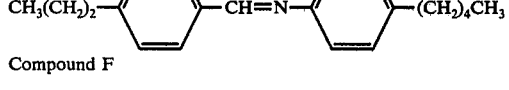 CH$_3$(CH$_2$)$_2$—⟨⟩—CH=N—⟨⟩—(CH$_2$)$_4$CH$_3$ | 50.1 <br> 49.9 | −9–89.1 |
| 41 | Compound F <br>  CH$_3$—⟨⟩—CH=N—⟨⟩—CH$_2$CH$_3$ | 50 <br> 50 | −20–73.9 |
| 42 | Compound G <br>  | 50.4 | 2–82.5 |

-continued

| Ex. No. | Nematic liquid crystal composition | Compound (% by weight) | Mesomorphic Range (° C.) |
|---|---|---|---|
| | CH₃(CH₂)₂—⌬—CH=N—⌬—(CH₂)₄CH₃ | 49.6 | |
| 43 | Compound G | 73.2 | 24–127.8 |
| | CH₃O—⌬—CH=N—⌬—O—C(=O)—(CH₂)₂CH₃ | 26.8 | |
| 44 | Compound G | 51.1 | −2.5–106.6 |
| | CH₃CH₂O—⌬—CH=N—⌬—(CH₂)₃CH₃ | 48.9 | |
| 45 | Compound G | 49.9 | 16–99.6 |
| | CH₃(CH₂)₂O—⌬—CH=N—⌬—(CH₂)₄CH₃ | 50.1 | |
| 46 | Compound G | 50.1 | −20–65.3 |
| | CH₃—⌬—CH=N—⌬—CH₂CH₃ | 49.9 | |
| 47 | Compound G | 74.6 | 16.5–115.5 |
| | CH₃O—⌬—CH=N—⌬—(CH₂)₂CH₃ | 25.4 | |
| 48 | Compound G | 50.3 | 8.5–98.1 |
| | CH₃O—⌬—CH=N—⌬—(CH₂)₆CH₃ | 49.7 | |
| 49 | Compound G | 49.9 | −20–91.6 |
| | CH₃O—⌬—CH=N—⌬—(CH₂)₃CH₃ | 50.1 | |
| 50 | Compound G | 74.8 | 16–87.4 |
| | CH₃—⌬—CH=N—⌬—(CH₂)₃CH₃ | 25.2 | |
| 51 | Compound G | 49.8 | 10–100.3 |
| | CH₃(CH₂)₃O—⌬—CH=N—⌬—(CH₂)₃CH₃ | 50.2 | |
| 52 | Compound H | 20 | 72–146 |
| | Compound M | 80 | |
| 53 | Compound I | 20 | 29–139 |

-continued

| Ex. No. | Nematic liquid crystal composition | Compound (% by weight) | Mesomorphic Range (° C.) |
|---|---|---|---|
| | CH₃(CH₂)₆—⟨⟩—CH=N—⟨⟩(Cl)—N=CH—⟨⟩—(CH₂)₆CH₃ | 80 | |
| 54 | Compound I<br>Compound M | 20<br>80 | 30–149 |
| 55 | Compound J<br>CH₃(CH₂)₂—⟨⟩—CH=N—⟨⟩—(CH₂)₄CH₃ | 26<br>74 | 11.5–73 |
| 56 | Compound J<br>CH₃(CH₂)₂—⟨⟩—CH=N—⟨⟩—(CH₂)₄CH₃ | 50<br>50 | 45–112 |
| 57 | Compound J<br>CH₃CH₂O—⟨⟩—CH=N—⟨⟩—(CH₂)₃CH₃ | 25<br>75 | 24.5–100.5 |
| 58 | Compound J<br>CH₃CH₂O—⟨⟩—CH=N—⟨⟩—(CH₂)₃CH₃ | 50<br>50 | 45–124 |
| 59 | Compound J<br>CH₃O—⟨⟩—CH=N—⟨⟩—(CH₂)₃CH₃ | 24<br>76 | 10.5–74.5 |
| 60 | Compound J<br>CH₃O—⟨⟩—CH=N—⟨⟩—(CH₂)₃CH₃ | 51<br>49 | 45–111 |
| 61 | Compound J<br>CH₃—⟨⟩—CH=N—⟨⟩—(CH₂)₃CH₃ | 72<br>28 | 43–122 |
| 62 | Compound J<br>CH₃O—⟨⟩—CH=N—⟨⟩—O—C(=O)—(CH₂)₂CH₃ | 27<br>73 | 39–133.5 |
| 63 | Compound J<br>CH₃O—⟨⟩—CH=N—⟨⟩—O—C(=O)—(CH₂)₂CH₃ | 50<br>50 | 41.5–149 |
| 64 | Compound J | 25 | 22–88.5 |

| Ex. No. | Nematic liquid crystal composition | Compound (% by weight) | Mesomorphic Range (° C.) |
|---|---|---|---|
| | CH₃O—⟨⟩—CH=N—⟨⟩—(CH₂)₆CH₃ | 75 | |
| 65 | Compound J | 51 | 39–119 |
| | CH₃O—⟨⟩—CH=N—⟨⟩—(CH₂)₆CH₃ | 49 | |
| 66 | Compound J | 50 | 30–91.5 |
| | CH₃—⟨⟩—CH=N—⟨⟩—CH₂CH₃ | 50 | |
| 67 | Compound J | 75 | 55–139 |
| | CH₃—⟨⟩—CH=N—⟨⟩—CH₂CH₃ | 25 | |
| 68 | Compound J | 50 | 45–120.5 |
| | CH₃O—⟨⟩—CH=N—⟨⟩—(CH₂)₂CH₃ | 50 | |
| 69 | Compound J | 25 | 19–92 |
| | CH₃(CH₂)₃O—⟨⟩—CH=N—⟨⟩—(CH₂)₃CH₃ | 75 | |
| 70 | Compound J | 23 | 22–99.5 |
| | CH₃(CH₂)₂O—⟨⟩—CH=N—⟨⟩—(CH₂)₄CH₃ | 77 | |
| 71 | Compound J | 50 | −31–156.5 |
| | CH₃(CH₂)₆—⟨⟩—CH=N—⟨Cl⟩—N=CH—⟨⟩—(CH₂)₆CH₃ | 50 | |
| 72 | Compound J | 40 | −30–152.5 |
| | Compound M | 60 | |
| 73 | Compound J | 30 | −33.5–165 |
| | Compound L | 70 | |
| 74 | Compound J | 35 | −20–166.5 |
| | Compound L | 65 | |
| 75 | Compound K | 75 | −34–123.5 |
| | CH₃(CH₂)₂O—⟨⟩—CH=N—⟨⟩—(CH₂)₄CH₃ | 25 | |
| 76 | Compound K | 75 | −32–114 |

-continued
| Ex. No. | Nematic liquid crystal composition | Compound (% by weight) | Mesomorphic Range (° C.) |
|---|---|---|---|
| 77 | 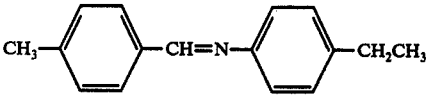 Compound K | 25 75 | −31–143.5 |
| 78 | 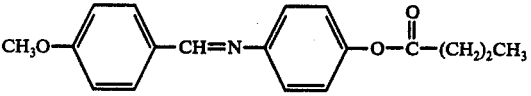 Compound K | 25 75 | −34–125 |
| 79 | 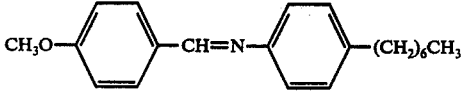 Compound K | 25 75 | −33–133 |
| 80 | 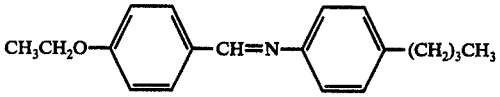 Compound K | 25 75 | −36–131 |
| 81 | 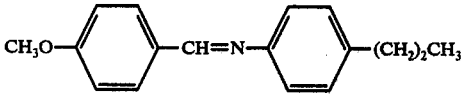 Compound K | 25 75 | −30.5–134 |
| 82 | 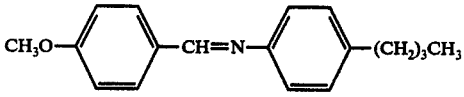 Compound K | 50 50 | −31–85 |
| 83 | 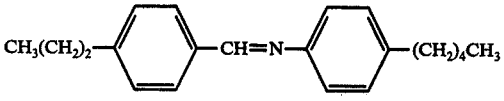 Compound K | 50 50 | −13.5–104 |
| 84 | 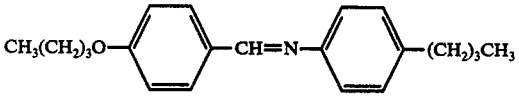 Compound K | 24 76 | −36–98.5 |
| 85 | 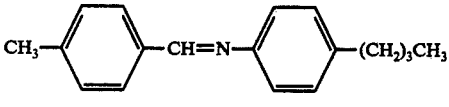 Compound K | 30 70 | −34–147 |
| 86 | 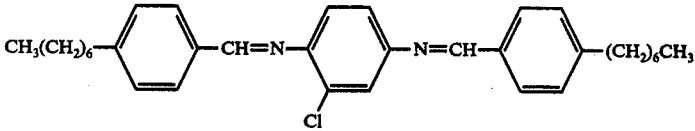 Compound K | 50 | −37–142 |

| Ex. No. | Nematic liquid crystal composition | Compound (% by weight) | Mesomorphic Range (°C.) |
|---|---|---|---|
| | CH₃(CH₂)₆—⟨⟩—CH=N—⟨⟩(Cl)—N=CH—⟨⟩—(CH₂)₆CH₃ | 50 | |
| 87 | Compound K | 40 | −26–139 |
| | Compound M | 60 | |
| 88 | Compound K | 50 | −40–143 |
| | Compound M | 50 | |
| 89 | Compound K | 50 | 26–156 |
| | Compound L | 50 | |
| 90 | Compound L | 25 | −29–141 |
| | CH₃(CH₂)₆—⟨⟩—CH=N—⟨⟩(Cl)—N=CH—⟨⟩—(CH₂)₆CH₃ | 75 | |
| 91 | Compound L | 30 | −35–139 |
| | CH₃(CH₂)₆—⟨⟩—CH=N—⟨⟩(Cl)—N=CH—⟨⟩—(CH₂)₆CH₃ | 70 | |
| 92 | Compound L | 55 | −38–147 |
| | CH₃(CH₂)₆—⟨⟩—CH=N—⟨⟩(Cl)—N=CH—⟨⟩—(CH₂)₆CH₃ | 45 | |
| 93 | Compound L | 60 | −36–147 |
| | CH₃(CH₂)₆—⟨⟩—CH=N—⟨⟩(Cl)—N=CH—⟨⟩—(CH₂)₆CH₃ | 40 | |
| 94 | Compound L | 50 | 14.5–146 |
| | Compound M | 50 | |
| 95 | Compound M | 50 | −25–135 |
| | CH₃(CH₂)₆—⟨⟩—CH=N—⟨⟩(Cl)—N=CH—⟨⟩—(CH₂)₆CH₃ | 20 | |

What is claimed is:

1. A nematic liquid crystal composition comprising at least one of the compounds having the formula,

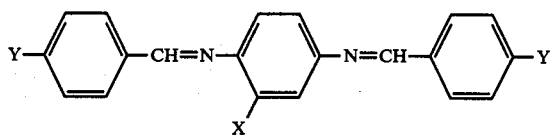

wherein X is methyl and Y is a normal - $C_nH_{2n+1}$ group wherein $n$ is an integer of 2 to 8, and at leat one of the compounds selected from the group consisting of the compounds having the general formula,

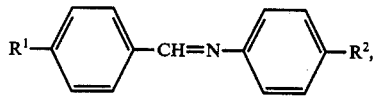 A.

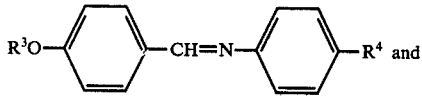 B.

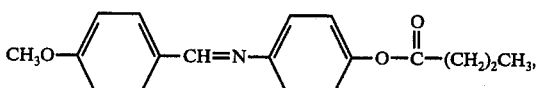 C.

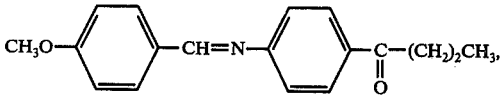 D.

wherein in the compound A, $R^1$ is an alkyl group having 1 to 3 carbon atoms and $R^2$ is an alkyl group having 2 to 5 carbon atoms; and in the compound B, $R^3$ is an alkyl group having 1 to 4 carbon atoms and $R^4$ is an alkyl group having 3 to 10 carbon atoms.

2. A nematic liquid crystal composition according to claim 1, which comprises one of the compounds of the formulas,

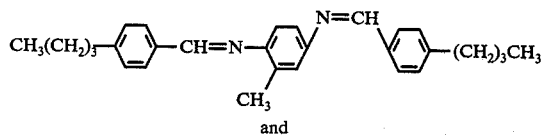
and

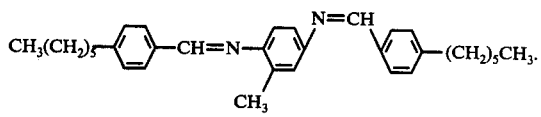

3. A nematic liquid crystal composition according to claim 1, which comprises one of the compounds of the formulas,

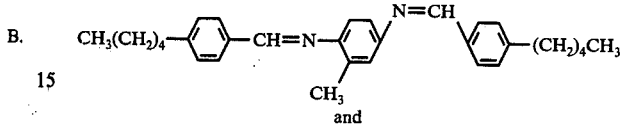
and

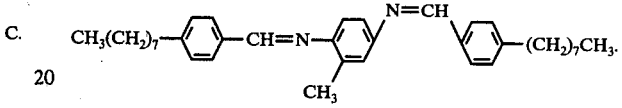

4. A nematic liquid crystal composition according to claim 1, which comprises one of the compounds of the formula,

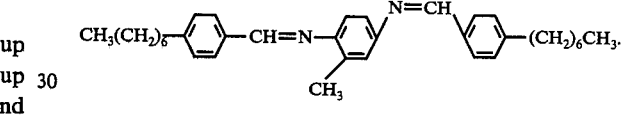

5. A nematic liquid crystal composition according to claim 1, which comprises one of the compounds of the formula,

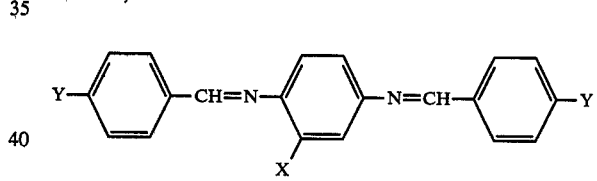

wherein X is methyl and Y is a normal-$C_nH_{2n+1}$ group, wherein n is an integer of 2 or 3.

* * * * *